United States Patent
McDonald et al.

(10) Patent No.: US 10,491,545 B2
(45) Date of Patent: Nov. 26, 2019

(54) VIRTUAL CHANNEL ROUTING

(71) Applicant: Hewlett Packard Enterprise Development LP, Houston, TX (US)

(72) Inventors: Nicholas George McDonald, Fort Collins, CO (US); Gary Gostin, Plano, TX (US); Darel N. Emmot, Fort Collins, CO (US); Gregg B. Lesartre, Fort Collins, CO (US); Al Davis, Coalville, CA (US); Derek Alan Sherlock, Boulder, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 129 days.

(21) Appl. No.: 15/606,402

(22) Filed: May 26, 2017

(65) Prior Publication Data
US 2018/0343210 A1 Nov. 29, 2018

(51) Int. Cl.
*H04L 12/935* (2013.01)
*H04L 12/713* (2013.01)

(52) U.S. Cl.
CPC ........ *H04L 49/3009* (2013.01); *H04L 45/586* (2013.01)

(58) Field of Classification Search
CPC ... H04N 21/443; H04L 49/3009; H04L 45/00; H04L 45/60; H04L 45/745
See application file for complete search history.

(56) References Cited

U.S. PATENT DOCUMENTS

| | | | |
|---|---|---|---|
| 6,101,181 A | 8/2000 | Passint et al. | |
| 8,224,885 B1* | 7/2012 | Doucette | G06F 9/5044 709/201 |
| 8,761,166 B2 | 6/2014 | Scott et al. | |
| 8,964,559 B2 | 2/2015 | Klausler | |
| 2002/0078226 A1* | 6/2002 | Kato | H04L 45/00 709/236 |
| 2004/0078459 A1 | 4/2004 | Moll | |
| 2004/0268387 A1* | 12/2004 | Wendling | H04N 5/4401 725/35 |
| 2005/0063394 A1 | 3/2005 | Ko | |

(Continued)

OTHER PUBLICATIONS

Fernandez, J.R. et al., A Burst-Oriented Traffic Control Framework for ATM Networks, (Research Paper), Retrieved Apr. 14, 2017, 8 Pgs.

(Continued)

*Primary Examiner* — Ayaz R Sheikh
*Assistant Examiner* — Debebe A Asefa
(74) *Attorney, Agent, or Firm* — Nolte Intellectual Property Law Group

(57) ABSTRACT

Examples relate to virtual channel routing in networks considering VC actions to be performed by the packets while routed through the network. A packet is received at an input port of a network device of a network and an output port and a VC action is determined from a routing table associated to the input port based on a packet's destination network device. A VC mask is determined from a Virtual Channel Action Table (VCAT), associated to the routing table, based on a packet's ingress VC and the VC action. A particular VC among the set of VCs defined in the VC mask is selected and the packet is routed to the destination network device using the output port and the particular VC.

20 Claims, 4 Drawing Sheets

(56) References Cited

U.S. PATENT DOCUMENTS

| | | | |
|---|---|---|---|
| 2005/0078601 A1* | 4/2005 | Moll | H04L 45/00 370/218 |
| 2006/0203725 A1 | 9/2006 | Paul et al. | |
| 2008/0107105 A1 | 5/2008 | Reilly et al. | |
| 2008/0151909 A1 | 6/2008 | Scott et al. | |
| 2012/0266204 A1 | 10/2012 | Will et al. | |

OTHER PUBLICATIONS

Jean-Noel Quintin et al, Transitively Deadlock-Free Routing Algorithms, (Research Paper), Mar. 12, 2016, 45 Pgs.
Keun Sup Shim et al, Static Virtual Channel Allocation in Oblivious Routing, Cornell University, Retrieved May 26, 2017, 6 Pgs.
International Search Report and Written Opinion received for PCT Patent Application No. PCT/US2018/034242, dated Sep. 20, 2018, 12 pages.

* cited by examiner

VIRTUAL CHANNEL ROUTING

BACKGROUND

Virtual Channels (VCs) in a computing network may create multiple logical data paths across a single physical link or connection in the computing network such that a physical channel may support several virtual channels multiplexed across the physical channel. These VCs may allocate their own network resources such as queues and buffer-to-buffer credits. Each unidirectional VC may be realized by an independently managed pair of (flit) buffers, Different packets can then share the physical channel on a flit-by-flit basis. VCs may avoid deadlock and reduce wormhole blocking in networks and may further improve network latency and throughput. In addition, VCs may be used to construct Adaptive Networking services.

DETAILED DESCRIPTION

Figure 1:
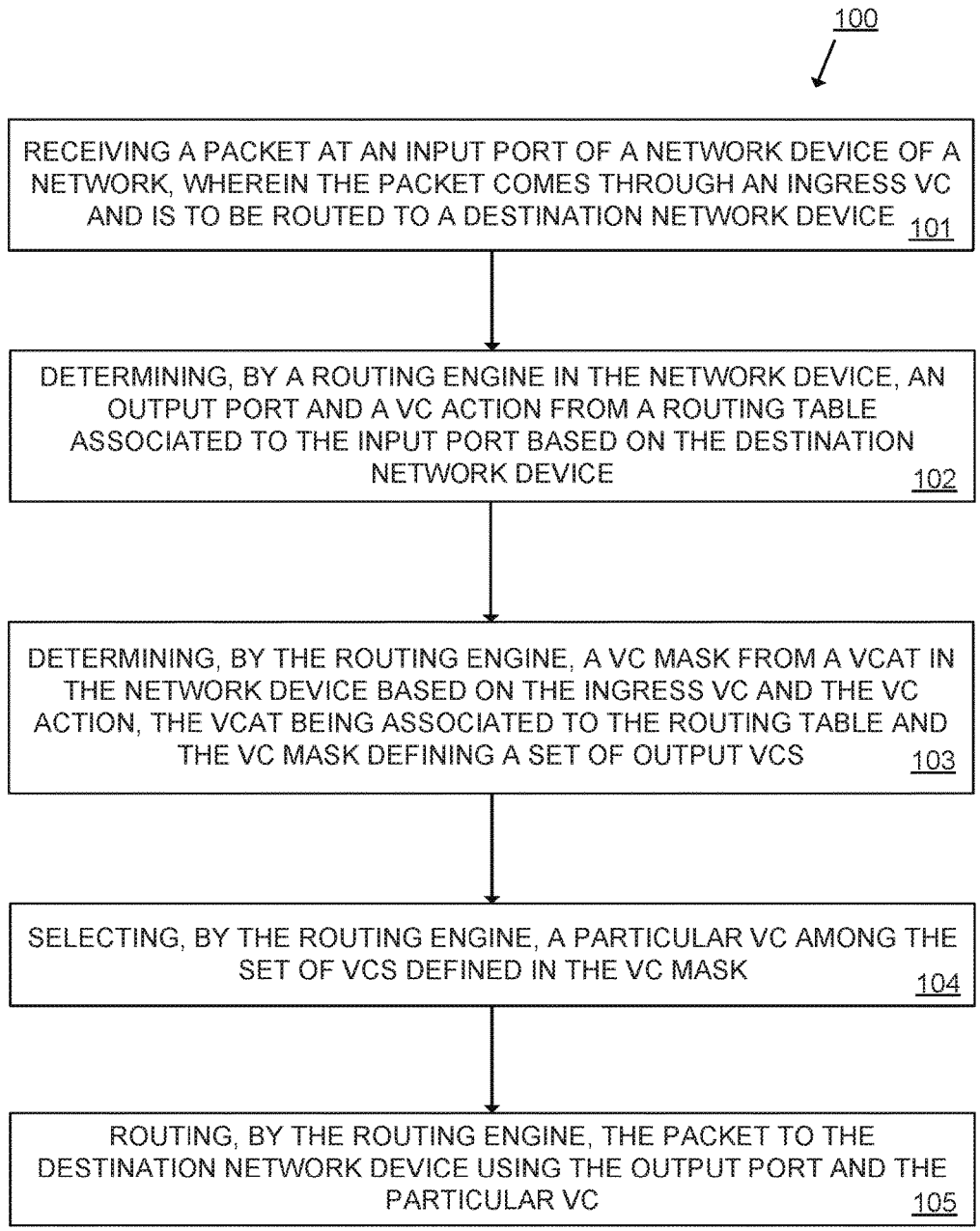
FIG. 1 is a flowchart of an example method for virtual channel routing.

Advanced high performance routing algorithms may require different actions, performed by the packets flowing through the networks, to be allowed under different virtual channels of the networks. These advanced high performance routing algorithms may further allow route VC remapping, which may provide the packets with the ability of switching virtual channels while routing through the network.

As generally described herein, a "VC action" may refer to an action that states how a packet is to transition from one VC to another VC given a specific network hop between two network devices. Examples of VC actions may be forwarding a packet from a source network device to a destination network device through the minimal route (minimal hop-count) or forwarding the packet from a source network device to a destination network device through a non-minimal route (non-minimal hop count). Other further examples of VC actions may be VC transitions such as a switch from an input VC though which a packet arrives to a particular network device to a different output VC through which the packet is to be forwarded to a destination network device.

These advanced high performance routing algorithms may use per-VC routing tables instead of per-port routing tables for providing these functionalities. However, using per-VC routing tables may require storing a routing table for each one of the VCs in the network and for each of the input ports of the network device. High Performance Computing (HPC) networks may use many virtual channels and each of the network devices of the HPC networks may comprise many input ports. For example, a device with 32 VCs and 64 ports would require 2,048 routing tables to be stored in internal memories of the network device. Thus, using per-VC routing tables may increase the amount of storage by the number of VCs in the network, the complexity for computing routes and therefore, the costs associated with the network devices. Also, some network topologies that use per-VC routing tables do not support VC remapping, which may make them useless for specific HPC networks. On contrast, topologies that support VC remapping for a fixed routing algorithm may be useless outside of their design.

To address these issues, some examples disclosed herein describe methods for routing packets through virtual channels in a network considering the VC actions to be performed by the packets flowing through the network. These methods may comprise receiving a packet at an input port of a particular network device of a network, wherein the packet comes to the particular network device through an ingress VC and is to be routed to a destination network device. Then a routing engine of the network device may determine an output port and a VC action from a routing table associated to the input port based on the destination network device to which the packet is to be sent. The output port is the port of the network device to be used to forward the packet to the destination network device and the VC action defines how the packet may transition from one VC to another VC given the hop between the current network device and the network device to which the packet is to be sent (this network device to which the packet is to be sent may be the destination network device or any other network device in the network acting as an intermediate node between the current network device and the destination network device).

As generally described herein, a routing engine may represent a combination of hardware and software logic in a network device for routing packets through virtual channels from a source network device to a destination network device in a network, considering the VC actions to be performed by the packets.

Then, the routing engine may determine a VC mask from a Virtual Channel Action Table (VCAT) in the network device based on the ingress VC and the VC action. The VCAT may be associated to the routing table and the VC mask may define a set of output VCs available and valid to forward the packet to the destination network device. The routing engine may further select a particular VC among the set of VCs defined in the VC mask and may route the packet to the destination network device using the output port and the particular VC.

In some examples, the routing table may store a plurality of routes and each route may define a set of output port-VC action pairs, wherein each output port is associated with a respective VC action. Depending on the destination network device for a packet, a set of output port-VC action pairs that allow the packet to reach said destination network device and that may be related with different routes in the routing table, may be selected. In such examples, the routing engine may determine a set of respective VC masks from the VCAT based on the ingress VC and the respective VC actions of the selected set of output port-VC action pairs.

In some other examples, the selection of the particular VC among the set of possible VCs defined by the VC mask may be based on different criteria, such as minimal route, shortest network hop, etc. In particular and by way of example, the routing engine may further assign a weight to the VCs and to the output ports used by the VCs and then, select an output port-VC pair with the least combined weight.

As generally described herein, the VC masks may be bit fields representing the valid output VCs that can be used by a packet under various VC actions. For example, a VC mask may be a bit field having as many bits as VCs in the network and wherein a "1" may represent a valid VC and a "0" may represent an invalid VC. Thus, by way of example, a VC mask "00110" may represent all the VCs "VC0,VC1,VC2, VC3,VC4" in the network, wherein VC2 and VC3 are valid VCs for a particular VC action (for example forwarding the packet to the destination network device through the minimal route) and wherein VC0, VC1 and VC4 are invalid VCs for that VC action. As an alternative to a bit field, this information could also be a list of valid VC identifiers.

Therefore, the methods herein described separate the functionality of computing routes with computing how the packet moves through the different VCs in the network into two separate tables for each one of the ingress ports of the network elements of the network. The routing table comprises the functionality associated to the computing of the routes while the VCAT, associated with the routing table, describes the functionality relative to the computing of how the packets passing through the network element move through the different VCs in the network.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 shows a flowchart of an example method 100 for virtual channel routing. Implementation of this method 100 is not limited to such example.

At step 101 of the method 100, a packet is received at a particular input port of a network device of the network. This packet comprises identifiers of the ingress VC where the packet comes through and of the destination network device to which the packet is to be routed. The packet may store said identifiers in the header. This particular destination network device may be another network device from the same network, an edge device of another network to which it is connected or any other device external to the network. In some examples, the packet received at the network device may be decoded by a routing engine of the network device to obtain the identifier of the destination network device and the ingress VC.

At step 102 of the method, the routing engine determines an output port and a VC action from a routing table associated to the input port based on the destination network device. For example, the columns of the routing table may refer to different routes for the packets such that each entry of the same column defines different output ports and their corresponding VC actions for a particular route. In some examples a set of output port-VC action pairs that allow reaching said destination network device may be selected by the routing engine, wherein each output port is associated to a respective VC action. In such examples, each entry on the same column of the routing table may store an output port-VC action pair associated to the respective route. Therefore, the destination network device indexes the routing table to determine the output port and the VC action for that packet.

At step 103 of the method 100, the routing engine determines a VC mask from a VCAT in the network device based on the ingress VC and the VC action. This VCAT is associated to the routing table such that there is one single routing table and a respective VCAT for each input port of the network device. The VCAT defines the VC actions that the packets may take into the network and determines the VCs valid for a packet to perform a particular VC action. For example, the columns of the VCAT may refer to the VC actions described in the routing table such that each entry of the same column corresponds to each one of the VCs of the network and comprises a different VC mask. Thus, the VCAT allows only a single routing table per-port while still allowing per-VC routing actions. When the routing engine determines a set of output port-VC action pairs, said routing engine may further determine a set of respective VC masks from the VCAT based on the ingress VC and the respective VC actions of the selected set of output port-VC action pairs. Therefore, the ingress VC obtained from the packet and the VC actions obtained from the routing table index the VCAT to determine the respective VC masks.

Furthermore, the VC mask defines a set of output VCs available and valid for the received packet to perform a corresponding VC action. In some examples the VC mask is a bit indicating with a "1" those VCs available and valid for forwarding the packet, and indicating with a "0" those VCs invalid for forwarding the packet to the destination network device. In such examples, a VC mask having all "1"s indicates that all VCs in the network are valid for that packet to perform the particular VC action, while a VC mask having all "0"s indicates that none of the VCs are valid for that packet to perform the particular action, which means that the VCs are invalid for that packet and thus the action cannot be performed.

In some examples, the routing engine may generate a set of output port-VC mask pairs by replacing the VC actions from the output port-VC action pairs with the corresponding VC masks obtained from the VCAT. Since a particular VC action in the routing table determines a VC mask in the VCAT (the ingress VC is fixed for a particular packet), said particular VC may be replaced with the corresponding VC mask.

At step 104 of the method 100, the routing engine selects a particular VC among the set of VCs defined in the VC mask. This selection may be performed based on different criteria. For example, the criteria may be selecting the VC having the lowest estimated latency to the destination device considering the latency due to the links and the network devices in the route. In such example the routing engine may assign a weight to each output port-VC pair that is calculated based on a propagation delay associated with this route. The weights associated with each route may be stored in the routing table, the VCAT or in an independent weight table store in the network device.

Lastly, at step 105 of the method 100, the routing engine routes the packet to the destination network device using the output port obtained from the routing table and the particular VC selected among the valid VCs defined by the VC mask obtained from the VCAT.

In some other examples, the routing engine prior to routing the packet through the output port and the selected VC, may update the identifier of the VC in the header of the packet with the output VC. In this way the next network device receiving the packet in the route will receive the packet with an updated identifier of the VC.

Therefore, the example methods herein described provide an abstraction of the actions that packets take while traversing networks and a mechanism for providing per-VC routing ability while only having routing tables on a per-VC basis.

Figure 2:
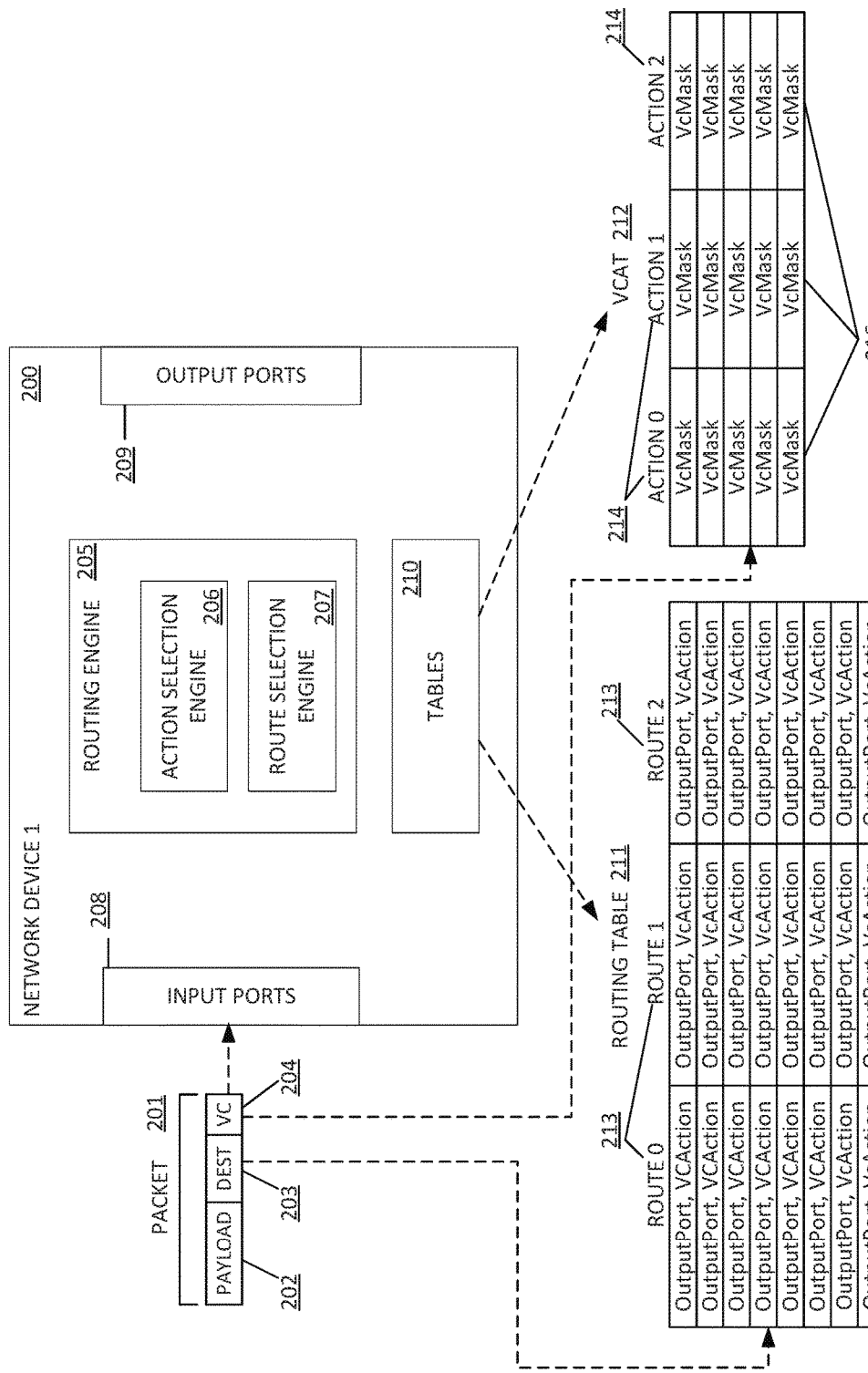
FIG. 2 is a block diagram of an example network device including a routing engine and a routing table and a Virtual Channel Action Table (VCAT) for each input port of the network device.

FIG. 2 is a block diagram of an example network device 200 including a routing engine 205 and a set of tables 210 comprising a routing table 211 and an associated VCAT 212 for each input port 208 of the network device 200. It should be understood that the example network device 200 depicted in FIG. 2 may include additional components and that some of the components described herein may be removed and/or modified without departing from a scope of the example network device 200. Additionally, implementation of example network device 200 is not limited to such example as shown in FIG. 2.

The network device 200, for example a router or switch, may be part of a network that may comprise any number of network devices. The network device 200 comprises a routing engine 205 that in turn comprises an action selection engine 206 and a route selection engine 207. The routing engine 205 accesses a set of tables 210 comprising a routing table 211 and an associated VCAT 212 for each input port 208 of the network device 200. The routing table 211 stores all routes between the network device 200 and each one of the rest of network devices in the network. Each route is shown in a column of the routing table and each entry 215 in a particular route identifies a particular output port 209 and an associated VC action 214. In turn, the VCAT 212 stores VC masks for each VC in the network and for all the VC actions 214 previously defined in the routing table 211. Each VC action 214 is shown in a column of the VCAT 212 and each entry 216 of a particular VC action 214 comprises a VC mask that identifies the valid VCs for the packet 201 to perform the corresponding VC action 214.

In such example, the packet 201 may be received at the network device 200 through one of its input ports 208 and may be decoded by the routing engine 205 to extract the identifier 203 of the destination network device and the identifier 204 of the ingress VC, through which the packet 201 has arrived to the network device 200, from the header of the packet 201 and the payload 202. The identifier 203 of the destination network device indexes the routing table 211 to determine the specific output port 209 to be used and the VC action 214 to perform for that packet 201. The identifier 204 of the ingress VC obtained from the packet 201 and the VC action 214 obtained from the routing table 211 index the VCAT 212 to determine the corresponding VC mask. This VC mask defines the valid VC of the network that may be used by the packet 201 to reach the destination network device using the output port and performing the VC action obtained from the routing table 211.

In some examples, the tables 210 may comprise a weight table (not shown in the figure) for each input port 208 in which a first weight is associated with each output port 209 of the network device 200 and each VC of the network. In some other examples, the weight table may store a combined weight for each possible output port-VC pair in the network. In some other examples, each of the entries 215 in the routing table 211 may store the weight associated with the output port 209 identified in the entry and entries 216 in the VCAT 212 may store the weights associated with the VCs marked as valid in the respective VC mask.

The weight of a particular VC in the network may be calculated by the routing engine 205 by considering the congestion of the VC, the number of hops to the destination network device and/or the propagation delay associated to the particular VC. For example, the congestion of the VC may refer to the delay sending a packet from a source node to a destination node due to existing data traffic in the route followed by the packet. The weight of a particular output port may be calculated by the routing engine 205 by considering the queue occupancy of the particular output port. In such examples, the output ports may comprise a buffer, for example a First-In-First-Out (FIFO) buffer or a ring buffer, to temporarily store packets to be forwarded to a neighbor network device. While the routing table in the example of FIG. 2 depicts three routes and each route identifies eight output port-VC action pairs, any other number of routes and pairs may be included, depending on the particular topology of the network.

In some examples, each of the routing tables 211 of a particular network device 200 may list the routes 213 to particular network destination devices, and in some cases, metrics (distances) associated with those routes 213. The routing table 211 of a particular network device 200 may further contain information about the topology of the network immediately around the particular network device 200. The routing tables 211 and the VCATs 212 of a particular network device 200 may be automatically and dynamically generated by each network device 200 by "discovering" procedures, or may be periodically provided by a network controller to each one of the network devices 200 of the network. In both cases, any change in the network topology may automatically trigger an updating process in the tables 210 in all or part of the network devices of the network.

Figure 3:
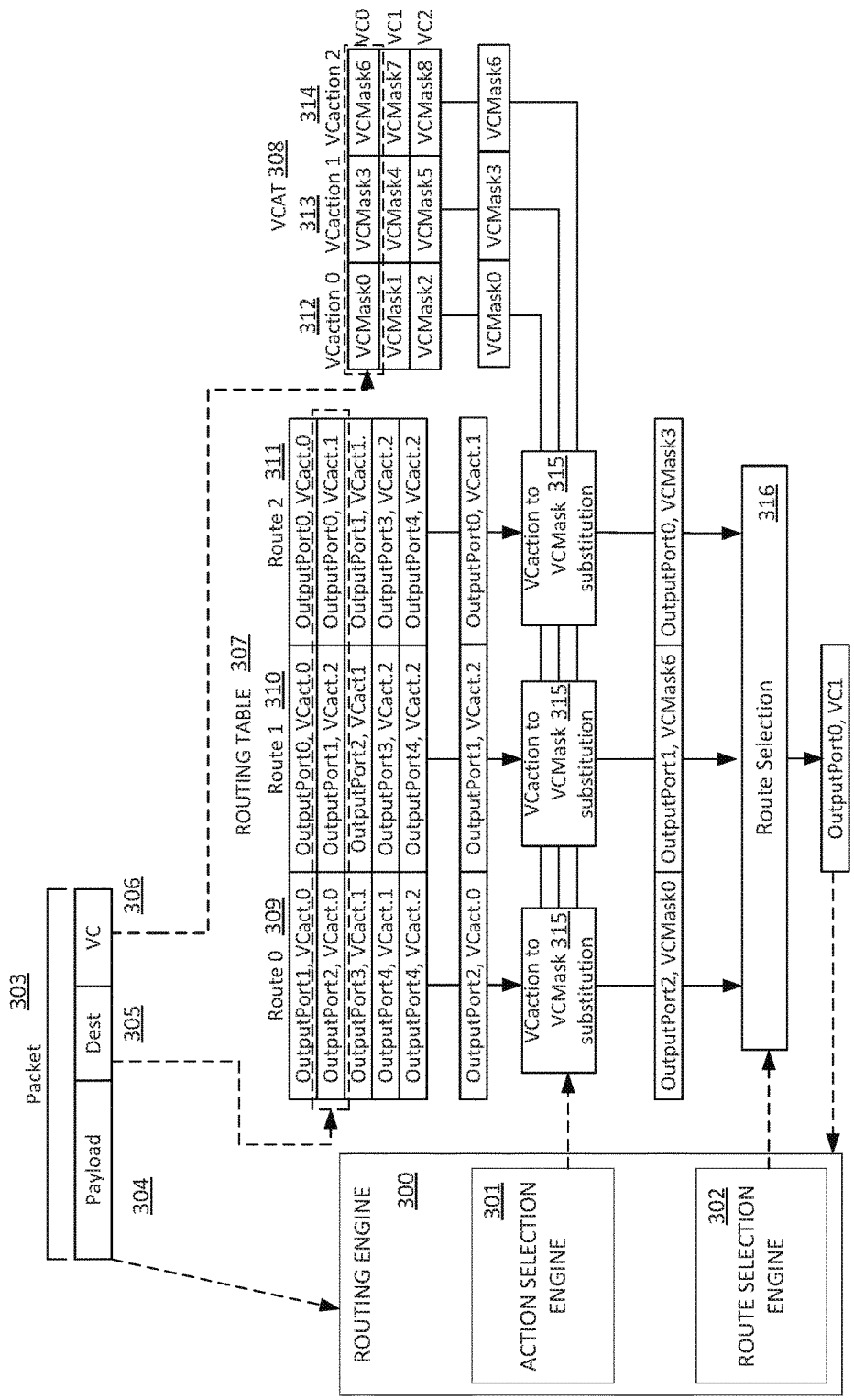
FIG. 3 is a block diagram of an example system including a routing engine, a routing table and a VCAT of a network device wherein packets are routed to a destination network device considering the VC action to be performed by packets.

FIG. 3 is a block diagram of an example system including a routing engine 300, a routing table 307 and an associated VCAT 308 of a network device (not shown in the figure), wherein packets are routed to a destination network device considering the VC actions to be performed by the packets. It should be understood that the system 300 depicted in FIG. 3 may include additional components and that some of the components described herein may be removed and/or modified without departing from a scope of the example system 300. Additionally, implementation of system 300 is not limited to such example as shown in FIG. 3.

The routing engine 300 comprises an action selection engine 301 and a route selection engine 302. A packet 303 is received at the network device through one of its input ports and is decoded by the routing engine 300 to extract the identifier 305 of the destination network device, the identifier 306 of the ingress VC, through which the packet 303 has arrived to the network device, and the payload 304. Then, the identifier 305 of the destination network device is used by the routing engine 300 to index the routing table 307 to determine the entries having output port-VC action pairs that are valid for reaching the destination network device. In turn, the identifier 306 of the ingress VC is used by the routing engine 300 to index the VCAT 308 associated to the routing table 307 to determine the corresponding VC masks that define valid VCs of the network that may be used by the packet 303 to reach the destination network device. The routing table 307 and the associated VCAT 308 in FIG. 3 are the tables associated with the input port though which the packet 303 has come to the network device, Each one of the other input ports of the network device is associated with a corresponding routing table-VCAT pair.

In such example, the routing table 307 comprises three columns corresponding to three different route options 309-311 per destination. In this example, each column comprises five different OutputPort-VCaction pairs, corresponding to five possible destinations. While the example of FIG. 3 may be implemented in a network device comprising five different output ports (OutputPort0-4) and defining three different VC actions (VCactions0-2), any other number of output ports and VC actions may be included. The VCAT 308 comprises three columns corresponding to the three pre-defined VC actions 312-314 (VCactions0-2) and three rows corresponding to the three different VCs (VC0-2) of the network.

In such example, the identifier 305 of the destination network device indexes one OutputPort-VCaction pair from each one of the three routes of the routing table. In some other examples, the identifier 305 may index any other number of pairs corresponding to all or part of the routes stored in the routing table 307. In particular, the identifier 305 of the destination network device indexes the second row of the routing table which selects OutputPort2-VCaction0, OutputPort1-VCaction2 and OutputPort0-VCaction1. OutputPort2-VCaction0 corresponds to route option 0 and indicates that the destination network device can be reached by forwarding the packet 303 through output port 2 of the network device and performing VCaction0 312, for example by forwarding the packet to the destination network device through the minimal route. OutputPort1-VCaction2 corresponds to route option 2 and indicates that the destination network device can be reached by forwarding the packet 303 through output port 1 of the network device and performing VCaction2 314, for example forwarding the packet 303 to the next network device in the route and incrementing the VC. OutputPort0-VCaction1 314 corresponds to route option 2 and defines that the destination network device can be reached by forwarding the packet 303 through output port 0 of the network device and performing VCaction1 313, for example by forwarding the packet 303 to the destination network device through a non-minimal route.

In such example, the identifier 306 of the ingress VC indexes, for each VC action identified in the OutputPort-VCaction pairs selected from the routing table 307, a VCMask from the VCAT 308. For example, having "VC0" as the ingress VC and VCaction0-2 identified in the selected OutputPort-VCaction pairs, the VCMask0, VCMask3 and VCMask6 are selected from the VCAT 308. By way of example, VCMask0 is the bit field "000" representing that none of the VCs of the network is valid for forwarding the packet 303 to the destination network device through the minimal route (VCaction0 312), VCMask3 is the bit field "111" representing that all of the VCs of the network are valid for forwarding the packet 303 to the destination network device through a non-minimal route (VCaction1 313) and VCMask6 is the bit field "010" representing that only VC1 is valid for forwarding the packet 303 to the next network device in the route and incrementing the VC (VCaction2 314).

Then, the action selection engine 301 of the routing engine 300 substitutes at 315 the VCactions from the selected OutputPort-VCaction pairs with the corresponding VCMask selected from the VCAT 308, creating a set of OutputPort-VCMask pairs. In particular the OutputPort2-VCMask0 pair, the OutputPort1-VCMask6 pair and the OutputPort0-VMask3 pair are created. These three OutputPort-VCMask pairs are three different alternatives for routing the packet 303 to the destination network device.

After that, the route selection engine 302 of the routing engine 300 selects at 316 one OutputPort-VCMask pair from the three alternatives of OutputPort-VCMask pairs based on pre-defined criteria. In such example, the OutputPort2-VCMask0 pair is discarded by the route section engine 302 since VCMask0 ("000") indicates that none of the VCs of the network is valid for forwarding the packet 303 to the destination network device. The OutputPort1-VMask6 pair may be selected by the route selection engine 302 since VCMask6 ("010") indicates that VC1 is valid for forwarding the packet 303 to the destination network device. The Outputport0-VCMask3 pair may be selected by the route selection engine 302 since VCMask3 ("111") indicates that all the VCs of the network are valid for forwarding the packet 303 to the destination network device.

In such example, the criteria for selection between OutputPort1-VCMask6 pair (VC1) and OutputPort0-VMask3 pair (VC0,VC1,VC2) may be selecting the VC having the lowest estimated latency to the destination device considering the latency due to the links and the network devices in the route. In some examples, the route selection engine 302 may further substitute the VCMasks from the selected Outputport-VCMask pairs with the corresponding valid VCs, creating a set of OutputPort-VC pairs. In this example, the route selection engine 302 creates a set of OutputPort-VC pairs including OutputPort0-VC0, OutputPort0-VC1, OutputPort0-VC2 and OutputPort1-VC1. Then, the routing engine 300 may assign a weight to each OutputPort-VC pair that is calculated based on an estimated latency associated to this route. The weights associated to each route may be stored in the routing table 307, the VCAT 308, or in an independent weight table stored (not shown) in the network device. By way of example, the OutputPort0-VC0 pair has an associated weight of "3", the OutputPort0-VC1 pair has an associated weight of "1", the OutputPort0-VC2 pair has an associated weight of "6" and the OutputPort1-VC1 pair has an associated weight of "8".

As a result, the route selection engine 302 selects at 316 the output port 0 and the VC1 to route the packet 303 to the destination network device. Lastly the routing engine 300 routes the packet to the destination network device using the output port 0 obtained from the routing table 307 and VC1 obtained from the VCAT 308.

Figure 4:
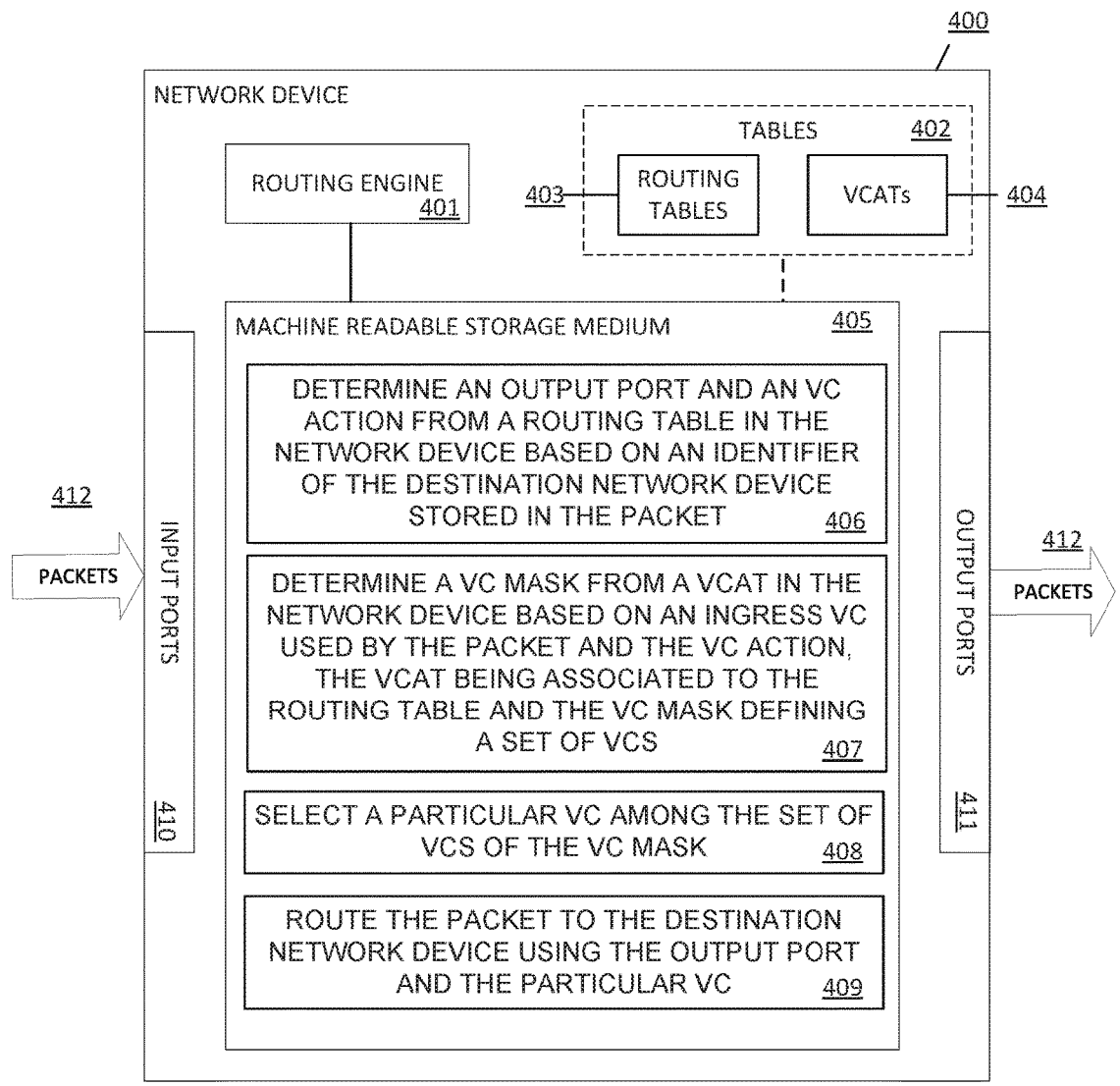
FIG. 4 is a block diagram of an example network device for virtual channel routing of packets considering the VC action to be performed by the packet.

FIG. 4 is a block diagram of an example network device 400 for virtual channel routing in which a machine-readable storage medium 405 stores instructions to be executed by a processing resource of a routing engine 401. It should be understood that the network device 400 depicted in FIG. 4 may include additional components and that some of the components described herein may be removed and/or modified without departing from a scope of the example network device 400. Additionally, implementation of network device 400 is not limited to such example. It should also be understood that routing engine 401 may represent a combination of hardware and software logic in network device 400 for routing packets through virtual channels from a source network device to a destination network device in a network, considering the VC actions to be performed by the packets.

The network device 400 is depicted as including a plurality of input ports 410 through which packets 412 of data are received, a plurality of output ports 411 through which packets 412 are forwarded towards their destination network devices, a machine readable storage medium 405, a routing engine 401 and a set of tables 402. The set of tables 402 comprises a routing table 403 and an associated VCAT 404 for each one of the input ports 410 of the network device 400. The routing engine 401 may include hardware and software logic to execute instructions, such as the instructions 406-409 stored in the machine-readable storage medium 405. The tables 402 may be stored in the machine readable storage medium 405 or may be stored in an independent and internal memory (not shown in the figure) of the network device 400. In some examples, each routing table 403 may store, for each input port 410, all the possible routes between the current network device 400 and the rest of network devices in the network.

In such example, the received packets 412 may store an identifier of the destination network device and an identifier of the ingress VC in their headers. The routing engine 401, in response to reception of a packet 412 via a particular input port 410 of the network device 400, determines at 406 an output port and a VC action from the routing table 403, associated to this particular input port 410, based on the identifier of the destination network device stored in the packet 412. The routing engine 401 further determines at 407 a VC mask from the VCAT 404 based on the ingress VC used by the packet 412 to arrive at the network device 400 and the VC action determined from the routing table 403. The VCAT 404 is associated to the routing table 403 and the VC mask defines a set of VCs that allow forwarding the packet 412 to the destination network device.

Then, the routing engine 401 further selects at 408 a particular VC among the set of VCs of the VC mask. This selection may be made based on a particular criterion such as selecting the VC having a lowest weight. Lastly, the routing engine 401 further routes at 409 the packet 412 to the destination network device using the output port and the particular VC previously selected.

In some examples, the routing engine 401 may also generate the routing table 403 storing a set of routes, with each route having a set of output ports associated to a respective VC action. The VC action is an action that states how the packet 412 is to transition from one VC to another VC given a specific network hop between two network devices. In such example, the routing engine 401 may also generate the VCAT 404 associated to the routing table 403, the VCAT 404 storing a VC mask for each VC in the network and for each VC action defined in the routing table 403.

In some other examples, the routing engine 401 selects all possible pairs of output ports and respective VC actions from the routing table 403 based on the destination network device. In such example, the routing engine 401 may further select all possible VC masks from the VCAT based on the ingress VC and the VC action. Then, the routing engine 401 may also substitute each VC action from the selected pairs of output ports and VC actions with the corresponding VC mask selected from the VCAT 404, creating a set of pairs of output ports with corresponding VC masks. Lastly, the routing engine 401 may select one pair of output port and VC mask from the set of pairs of output ports and VC masks.

The routing engine 401 may include hardware and software logic to perform the functionalities described above in relation to instructions 406-409. The machine-readable storage medium 405 may be located either in the computing device executing the machine-readable instructions, or remote from but accessible to the computing device (e.g., via a computer network) for execution.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

The virtual channel routing techniques as described herein improve the routing flexibility of per-VC routing tables while having the space overheads of per-port routing tables. This allows the implementation of very high performance routing algorithms to fit within the routing tables of network devices where space is a serious limitation. The space savings of these techniques are proportional to the number of VCs present in the system. For example, a system with 32 VCs and 64 ports per device would require 2,048 routing tables per device if implemented on a per-VC basis, however the virtual channel routing techniques as described provide the same routing performance with only 64 routing tables alongside of 64 VCATs (which are small by nature).

The invention claimed is:

1. A method, comprising:
receiving a packet at an input port of a network device of a network, wherein the packet comes through an ingress Virtual Channel (VC) and is to be routed to a destination network device via an output port and a particular egress VC as determined by a routing engine in the network device;
determining a selected pair of an output port and a VC action, the selected pair obtained from a first routing table from a plurality of routing tables maintained by the network device, the first routing table associated to the input port, the determination of the selected pair based on the destination network device identified in the packet;
determining, by the routing engine, a VC mask from a Virtual Channel Action Table (VCAT) in the network device, the VC mask based on the ingress VC and the VC action, the VCAT being associated to the first routing table and the VC mask defining a first set of available output VCs, relative to VCs defined in the network, to forward the packet to the destination network device;
selecting, by the routing engine, a particular VC among the first set of available output VCs defined in the VC mask; and
routing, by the routing engine, the packet to the destination network device using the output port and the particular VC.

2. The method of claim 1, further comprising one VCAT associated to the routing table for each input port of the network device.

3. The method of claim 1, wherein determining the selected pair from the routing table comprises identifying, by the routing engine, a second set of possible pairs of output ports and respective VC actions from the routing table based on the destination network device, wherein each possible pair from the second set of possible pairs has an associated combined weight.

4. The method of claim 1, wherein determining the VC mask from the VCAT comprises selecting, by the routing engine, a third set of possible VC masks from the VCAT based on the ingress VC and the VC action.

5. The method of claim 4, further comprising substituting each VC action from the second set of possible pairs of output ports and respective VC actions with a corresponding VC mask selected from the third set, creating a fourth set of pairs of output ports with corresponding VC masks.

6. The method of claim 5, further comprising selecting one pair of output port and VC mask from the fourth set of pairs of output ports with corresponding VC masks.

7. The method of claim 1, further comprising:
obtaining a particular routing table as the first routing table, the particular routing table associated to a particular ingress port of the network device, the particular routing table storing:
a collection of routes, each route of the collection of routes having one or more output ports associated to a respective VC action, wherein the respective VC action is an action selected with respect to a movement of the packet between a first network device and the destination network device, wherein the movement includes VC remapping to transition the packet from a first VC to a second VC.

8. The method of claim 1, wherein receiving the packet at the network device comprises decoding the packet, by the routing engine, to obtain an identifier of the destination network device and the ingress VC.

9. A non-transitory machine readable storage medium comprising instructions executable by a routing engine of a network device to:
in response to reception of a packet in the network device, make a first determination of an output port and a VC action from a first routing table of a plurality of routing tables maintained in the network device, the first determination based on an identifier of the destination network device stored in the packet;
obtain a VC mask from a Virtual Channel Action Table (VCAT) in the network device based on an ingress VC used by the packet and the VC action, the VCAT being associated to the first routing table, the VC mask defining a first set of available VCs, relative to VCs defined in the network, that allow forwarding the packet to the destination network device;
select a particular VC from the first set of available VCs as identified in the VC mask; and
route the packet to the destination network device using the output port and the particular VC.

10. The non-transitory machine readable storage medium of claim 9, wherein the instructions to make the first determination of the output port and the VC action from the first routing table comprise instructions to identify all possible pairs of output ports and respective VC actions from the first routing table based on the destination network device.

11. The non-transitory machine readable storage medium of claim 9, wherein the instructions to obtain the VC mask from the VCAT comprise instructions to identify all possible VC masks from the VCAT based on the ingress VC and the VC action.

12. The non-transitory machine readable storage medium of claim 10, further comprising instructions to substitute each respective VC action from the identified pairs of output ports and respective VC actions with a corresponding VC mask selected from the VCAT, creating a second set of pairs of output ports with corresponding VC masks.

13. The non-transitory machine readable storage medium of claim 12, comprising instructions to select one pair of output port and VC mask from the second set of pairs of output ports with corresponding VC masks.

14. The non-transitory machine readable storage medium of claim 9, comprising instructions to:
obtain a particular routing table as the first routing table, the particular routing table associated to a particular ingress port of the network device, the particular routing table storing a third set of routes and each route having one or more output ports associated to a respective VC action, wherein the respective VC action is an action selected with respect to a movement of the packet between two network devices within the network, the movement including VC remapping to transition the packet from a first VC to a second VC.

15. The non-transitory machine readable storage medium of claim 9, wherein the instructions to make the first determination comprise instructions to decode the packet to obtain an identifier of the destination network device and the ingress VC.

16. A network device comprising:
at least one input port;
at least one output port;
a plurality of information tables, including a first routing table and a Virtual Channel Action Table (VCAT) associated to each input port, wherein the first routing table stores a first set of routes and each route in the first set of routes has at least one output port associated to a respective VC action, wherein the VCAT stores VC masks for each VC action, the VC masks defining a second set of available VCs, relative to VCs defined in the network, that allow forwarding the packet to a destination network device; and
a routing engine to:
determine a particular output port and a VC action from the first routing table based on an identifier of the destination network device stored in a received packet,
obtain an instance of a VC mask from the VC masks stored in the VCAT, the instance of the VC mask based on an ingress VC used by the received packet and the VC action,
select a particular VC based on the particular VC being identified as available in the instance of the VC mask, and
route the packet to the destination network device using the output port and the particular VC.

17. The network device of claim 16, wherein the routing engine determines a particular routing table as the first routing table based on the particular routing table being associated to a particular input port of the network device and determines the VCAT associated to the particular routing table.

18. The network device of claim 16, wherein the VC action is an action selected with respect to a movement of the packet between two network devices within the network, the movement including VC remapping to transition the packet from a first VC to a second VC.

19. The network device of claim 16, wherein the routing engine comprises an action selection engine to replace VC actions from output port-VC action pairs with corresponding VC masks obtained from the VCAT, creating a third set of pairs of output ports with corresponding VC masks.

20. The network device of claim 19, wherein the routing engine comprises a route selection engine to select one pair of output port and VC mask from the third set of pairs of output ports with corresponding VC masks.

* * * * *